(12) United States Patent
Lu

(10) Patent No.: US 6,321,416 B1
(45) Date of Patent: Nov. 27, 2001

(54) HINGE FOR A NOTEBOOK COMPUTER

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 09/357,348

(22) Filed: Jul. 14, 1999

(51) Int. Cl.$^7$ .................................................. E05D 11/06
(52) U.S. Cl. ................................. 16/374; 16/338; 16/372
(58) Field of Search ........................... 16/348, 342, 374, 16/371, 338, 339, 340, 337, 352, 273, 274, 319; 403/111, 113, 66, 70, 71, 68

(56) References Cited

U.S. PATENT DOCUMENTS

| | | | |
|---|---|---|---|
| 5,190,391 | * | 3/1993 | Huong ................................ 403/96 |
| 5,632,066 | * | 5/1997 | Huong ................................ 16/338 |
| 5,896,622 | * | 4/1999 | Lu ...................................... 16/342 |
| 6,170,120 | * | 1/2001 | Lu ...................................... 16/342 |

* cited by examiner

Primary Examiner—Anthony Knight
Assistant Examiner—Matthew E. Rodgers
(74) Attorney, Agent, or Firm—Dorsey & Whitney LLP

(57) ABSTRACT

A hinge for a notebook computer is disclosed. The hinge has a leaf which connects to the body of a notebook computer, a pintle pivotally received in the leaf and connecting to the screen of a notebook computer, and a restrictive ring round the pintle to limit the rotational movement of the pintle

7 Claims, 9 Drawing Sheets

HINGE FOR A NOTEBOOK COMPUTER

BACKGROUND OF THE INVENTION

1. Field of the Invention

The invention relates to a hinge for a notebook computer, especially to a hinge that is strong and has better lubricating features and fewer constituent parts.

2. Description of Related Art

A conventional hinge for a notebook computer consists of a seat, a longitudinal or transverse spring slit defined therein, and a spring in the spring slit. The spring is able to pivot around a shaft. However, the following problems often arise in this hinge:

1. The strength of the seat is insufficient so as that the seat is often destroyed.
2. The lubrication of the seat, spring slit, and the spring is insufficient so the life span of the hinge is short.
3. Because there are a large number of constituent parts, the manufacturing cost is high.

SUMMARY OF THE INVENTION

It is an objective of the invention to provide a hinge for a notebook computer that is strong.

Another objective of the invention is to provide a hinge having a lubrication device that is able to enhance the lubrication to reduce the friction between the leaf and the pintle thus prolong the life span of the hinge.

Yet another objective of the invention is to provide a hinge having fewer constituent parts than a conventional hinge to reduce the manufacturing cost.

Other objects, advantages and novel features of the invention will become more apparent from the following detailed description when taken in conjunction with the accompanying drawings.

DETAILED DESCRIPTION OF PREFERRED EMBODIMENTS

Figure 1:
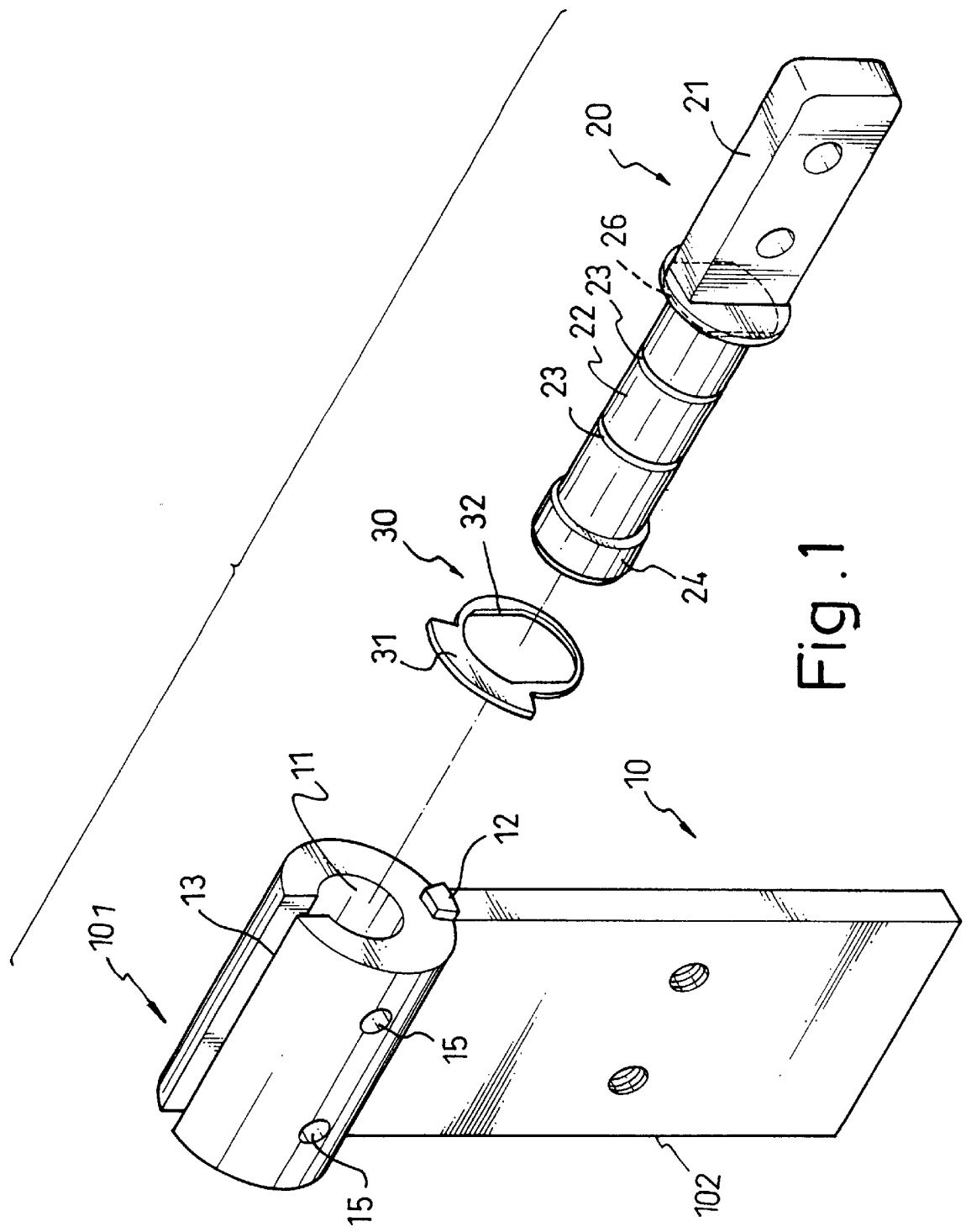
FIG. 1 is an exploded perspective view of a first embodiment of a hinge for a notebook computer in accordance with the present invention.

As shown in FIG. 1. The hinge comprises a leaf(10) and a pintle (20) pivotally received in the leaf (10).

The leaf (10) consists of an elastic receiver (101) to receive the pintle (20) therein, and a computer connector (102) securely formed with the receiver (101) and used to connect the hinge to the body of the notebook computer. The receiver (101) is a cylinder having a hole (11) axially defined therein, and a gap (13) axially defined through the entire length of the receiver (101) and communicating with the hole (11). A stop (12) is formed on the end face of the receiver (101). As a part of a lubrication device, at least one through hole (15) is defined in the surface of the receiver (101) and extends to communicate with the hole (11).

The pintle (20) comprises a connection portion (21) to attach to the screen of a notebook computer, and a shaft (22) integrally formed with the connection portion (21) and pivotally received in the hole (11). As the other part of the lubrication device, at least one groove (23) to conduct lubricant is defined on the surface of the shaft (22). A cap (24) is formed on the free end of the shaft (22). The diameter of the cap (24) is slightly larger than the diameter of the shaft (22) and is used to prevent the shaft (22) from sliding out of the receiver (101) after the shaft (22) is inserted in the hole (11). Due to the elasticity of the receiver (101) and the existence of the gap (13), the receiver (101) can be spread by the cap (24) when the shaft (22) together with the cap (24) is inserted into the hole (11) and resumes its normal shape after the cap (24) passes through the hole (11).

A ring (30) has an elliptic opening (32) defined to receive an elliptic collar (26) correspondingly formed on the pintle (20). After the engagement between the ring (30) and the elliptic collar (26) and the insertion of the shaft (22) into the hole (11) of the receiver (101), the rotation of the shaft (22) will simultaneously drive the restrictive ring (30) to rotate with it. However, due to the formation of the stop (12) on the bottom of the receiver (101) and a cam sector (31) on the ring (30), the rotation of the ring (30) with respect to the shaft (22) will be limited because of the engagement between the cam sector (31) and the stop (12).

Figure 2:
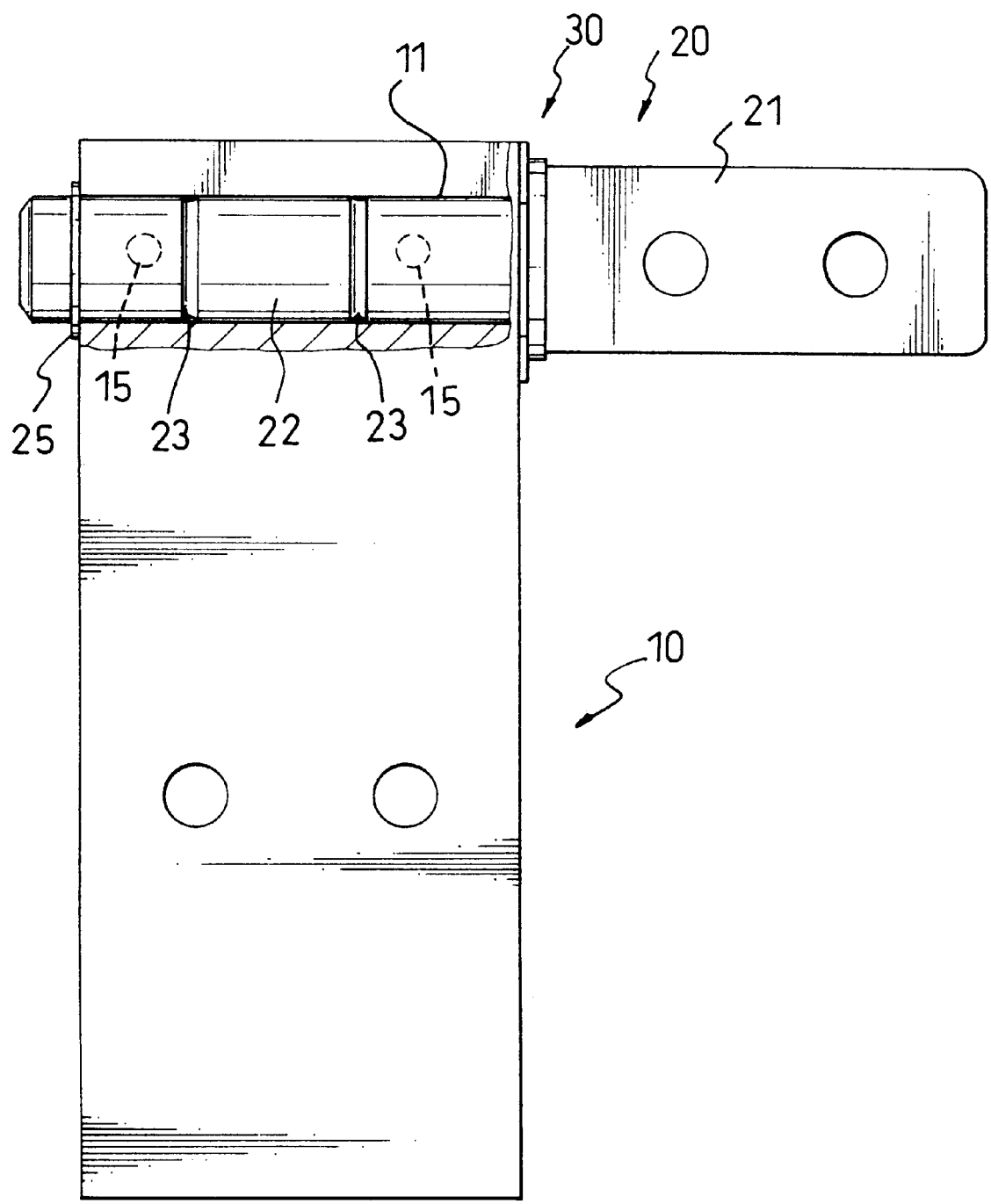
FIG. 2 is a front plan view in partial section of a variation of the hinge for a notebook computer in FIG. 1.
Figure 7:
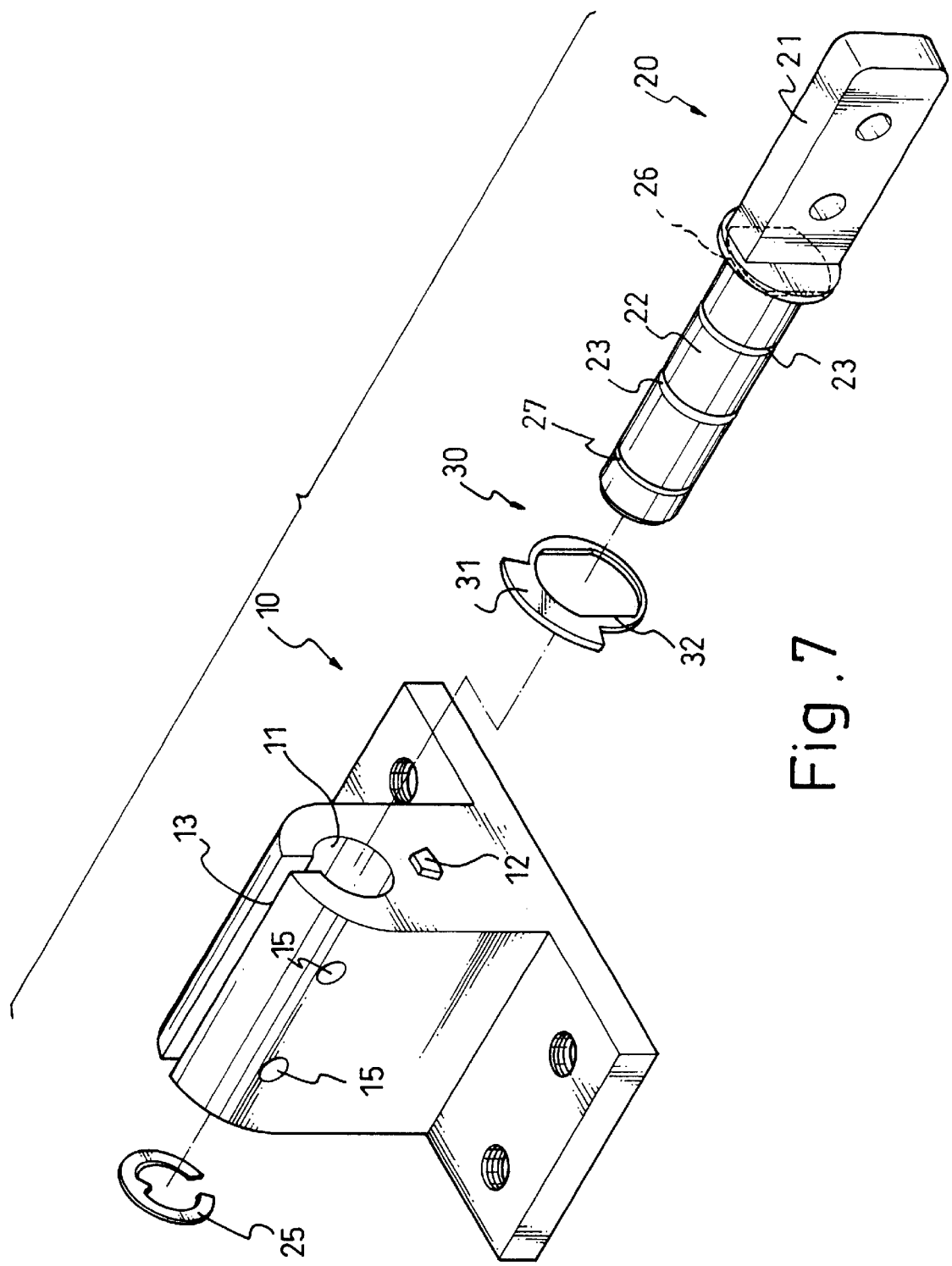
FIG. 7 is an exploded perspective view of a fifth embodiment of the hinge for a notebook computer in accordance with the present invention.

In another embodiment shown in FIG. 2, the cap (24) is replaced by a C-ring (25) placed in a circular groove (27) defined in the surface of the shaft (22) as shown in FIG. 7.

The thickness of the receiver (101) tapers to the gap (13). Due to this tapering of the seat, the strength of the leaf is significantly enhanced.

Additionally, the provision of the at least one slot (15) and at least one groove (23) for lubrication is able to greatly reduce the friction between the receiver (101) and the pintle (20).

Figure 3:
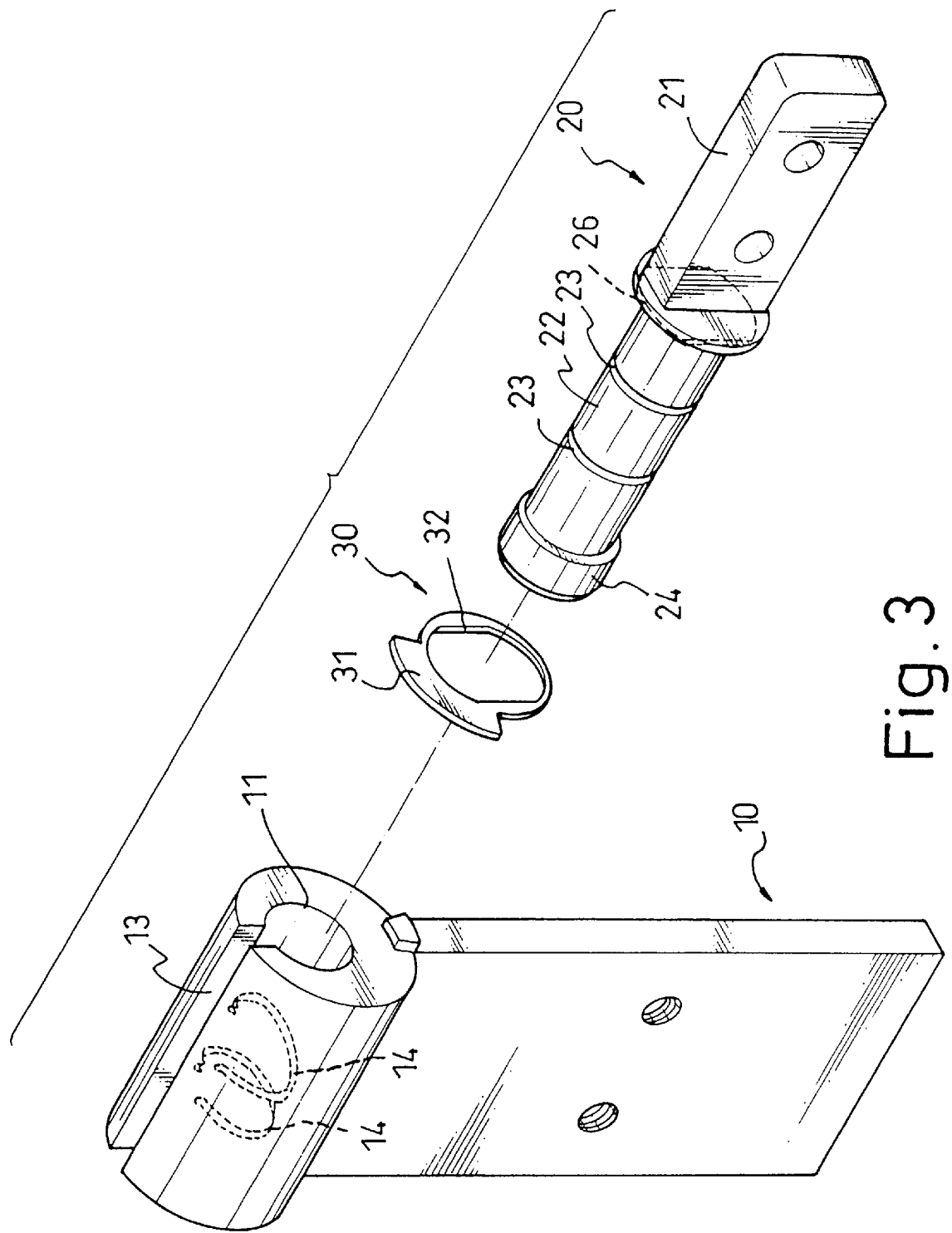
FIG. 3 is an exploded perspective view of a second embodiment of a hinge for a notebook computer in accordance with the present invention.

Most of the embodiment shown in FIG. 3 is the same as the one shown in FIG. 1 and difference lies in:

the hole (15) shown in FIG. 1 here is defined in the inner surface of the hole (11) of the receiver (101).

Figure 4:
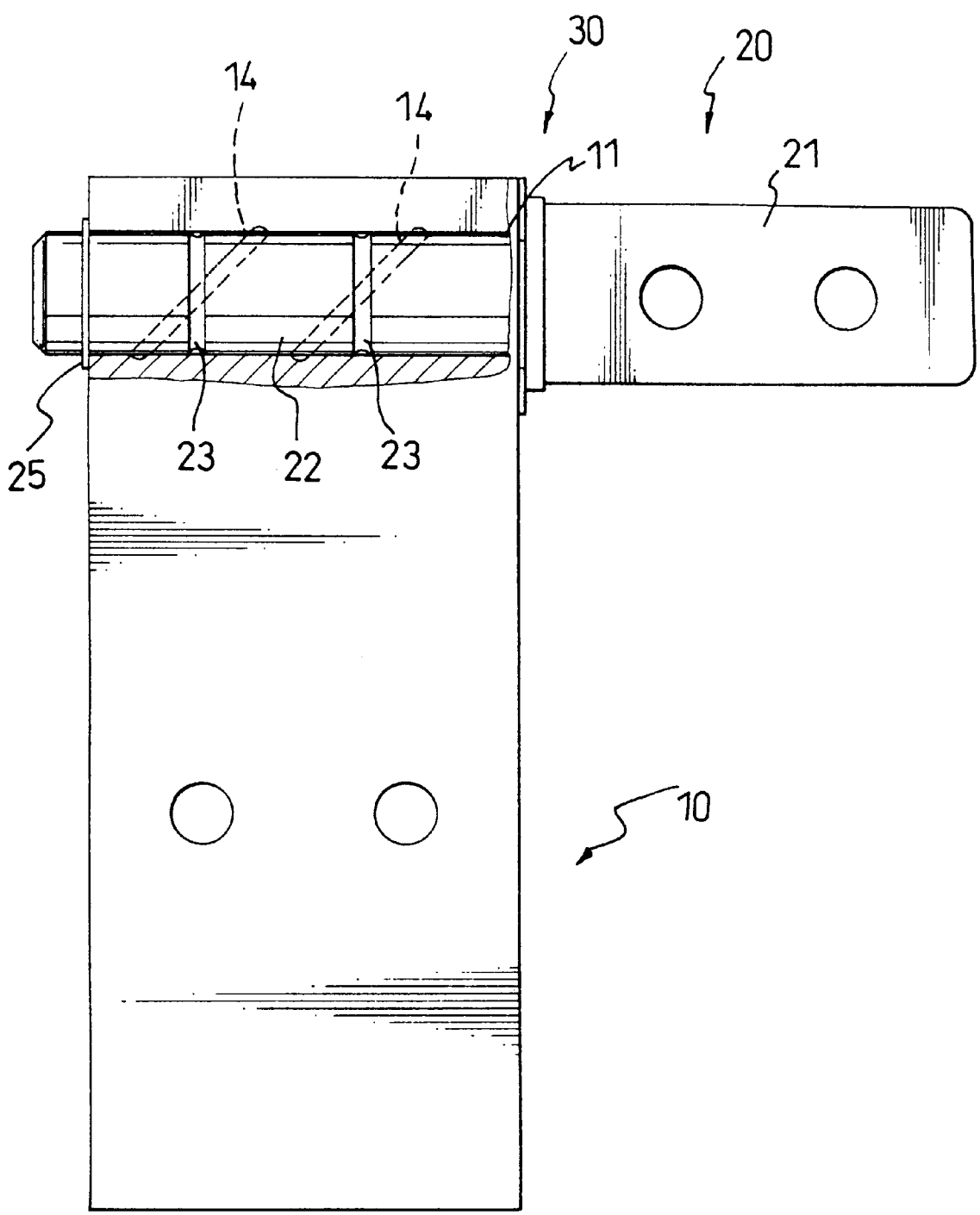
FIG. 4 is a front plan view in partial section of a variation of the hinge for a notebook computer in FIG. 3.

Most of the embodiment shown in FIG. 4 is the same as the one shown in FIG. 1 and the difference lies in:

the shaft (22) is held in the receiver (101) by a C-ring (25) placed in the circular groove (27) defined in the surface of the shaft (22) as shown in FIG. 7 rather than the cap (24) after the shaft (22) is inserted into the hole (11).

Figure 5:
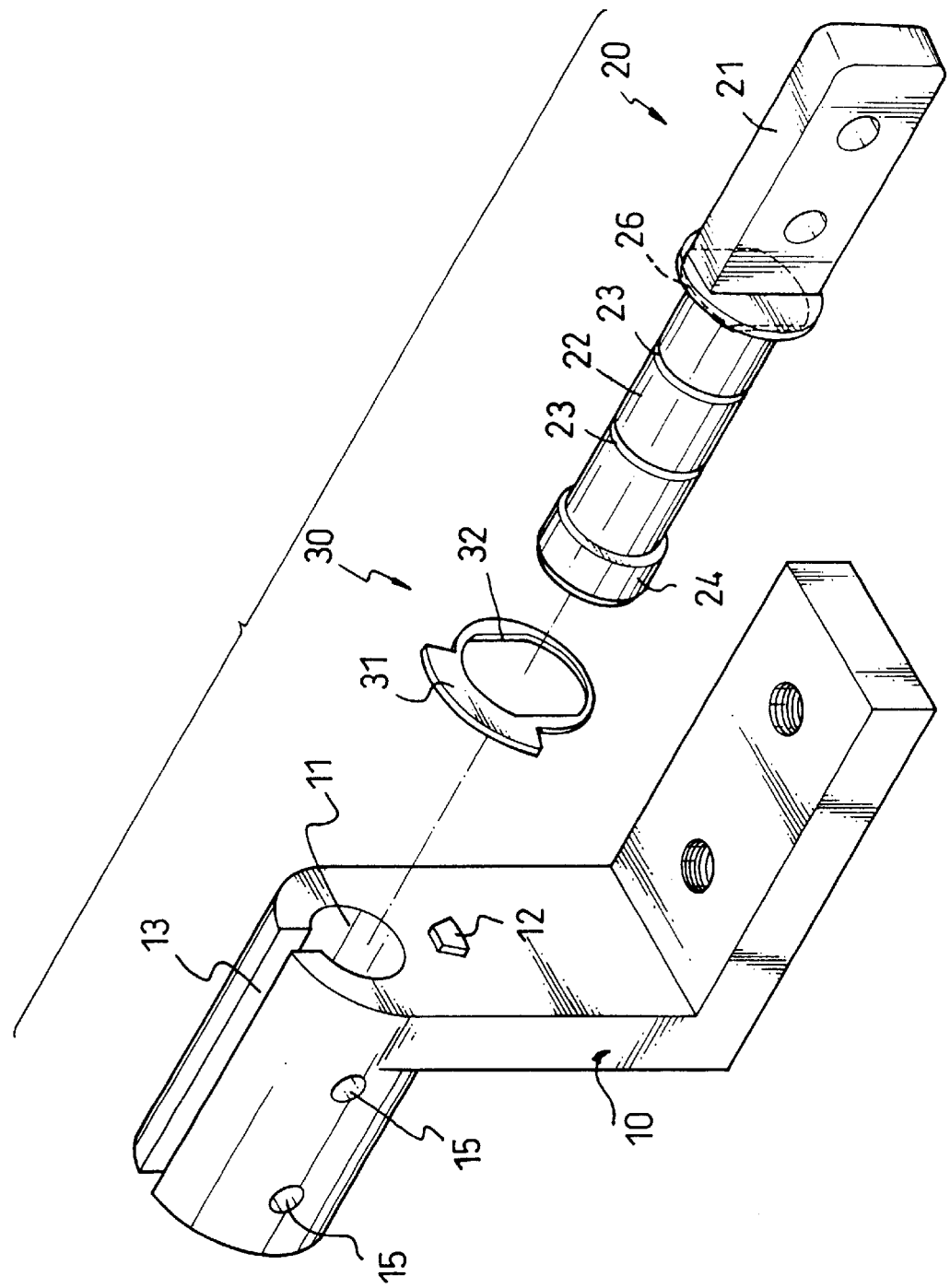
FIG. 5 is an exploded perspective view of a third embodiment of the hinge for a notebook computer in accordance with the present invention.

Most of the embodiment shown in FIG. 5 is the same as the one shown in FIG. 1 and the difference lies in:

the connector (101) is L-shaped and extends downward from one end of the receiver (101).

Figure 6:
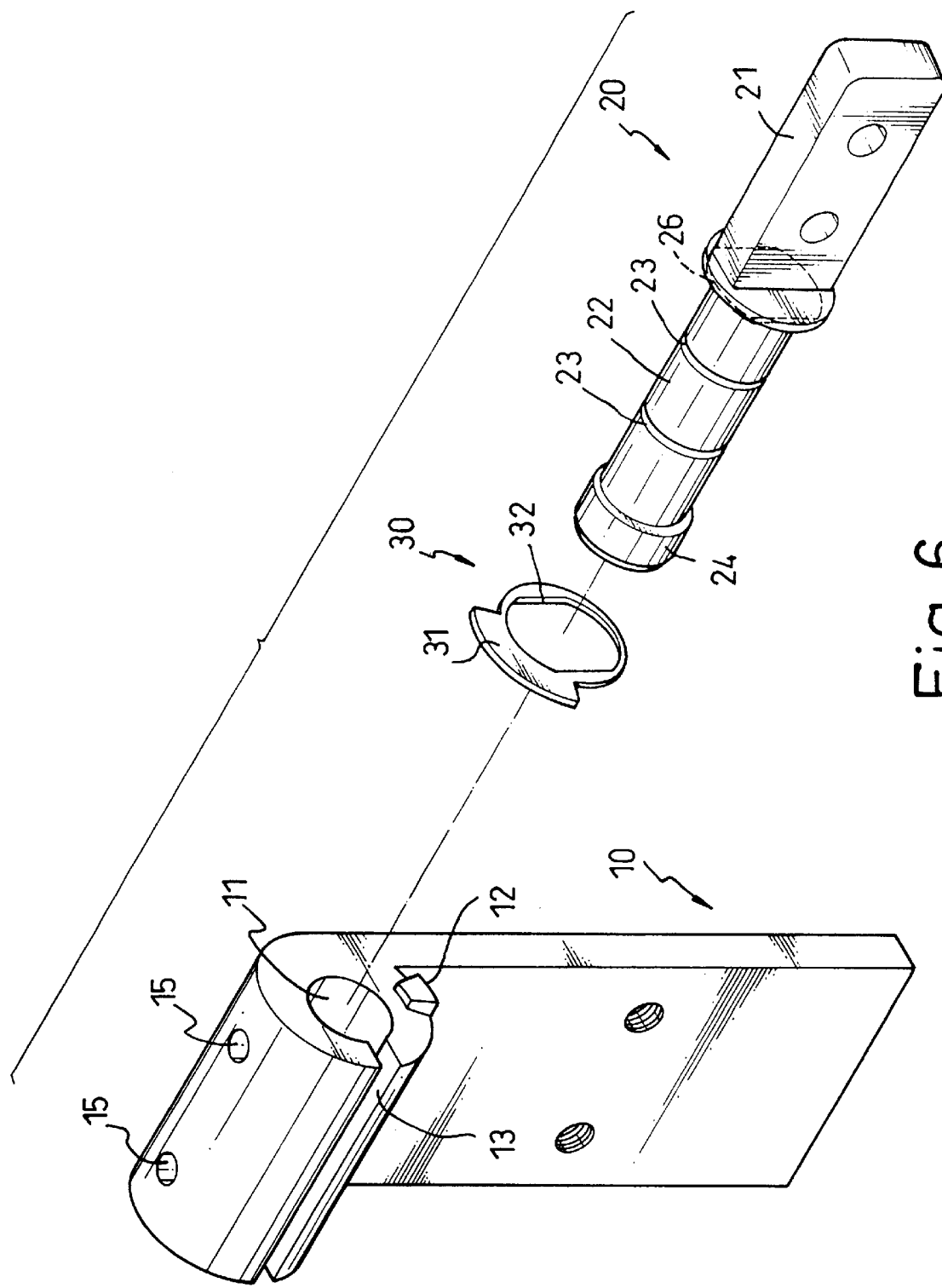
FIG. 6 is an exploded perspective view of a fourth embodiment of the hinge for a notebook computer in accordance with the present invention.

Most of the embodiment shown in FIG. 6 is the same as the one shown in FIG. 1 and the difference lies in:

the connector (101) extends in one direction from one tangent of the receiver (10); the gap (13) here is defined substantially on the diametrically opposite side of the receiver (101).

Most of the embodiment shown in FIG. 7 is the same as the one shown in FIG. 2 and the difference lies in:

the connector (102) extends in two directions from an elongation of the receiver (10); the gap (13) is defined on the opposite side of the receiver (101).

Figure 8:
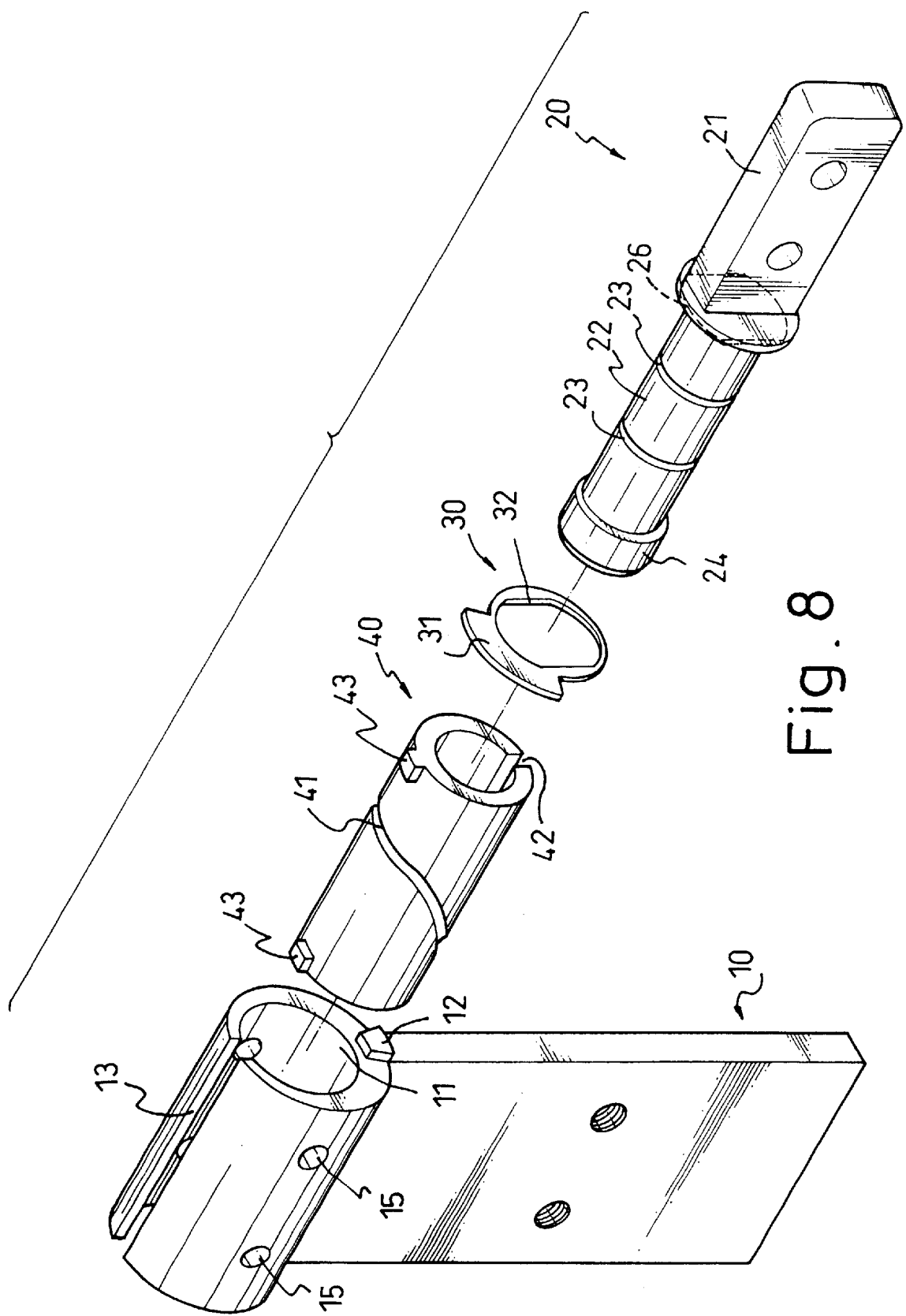
FIG. 8 is an exploded perspective view of a sixth embodiment of the hinge for a notebook computer in accordance with the present invention.

Most of the embodiment shown in FIG. 8 is the same as the one shown in FIG. 2 and the difference lies in:

a receiver liner (40) is provided within the hole (11). The receiver liner (40) has a slot (41) for oil discharge, a gap (42) and at least one lug (43) formed on the surface thereof. The lug (43) engages with the receiver (101) gap (13) to hold the receiver liner (40) with respect to the leaf (10).

Figure 9:
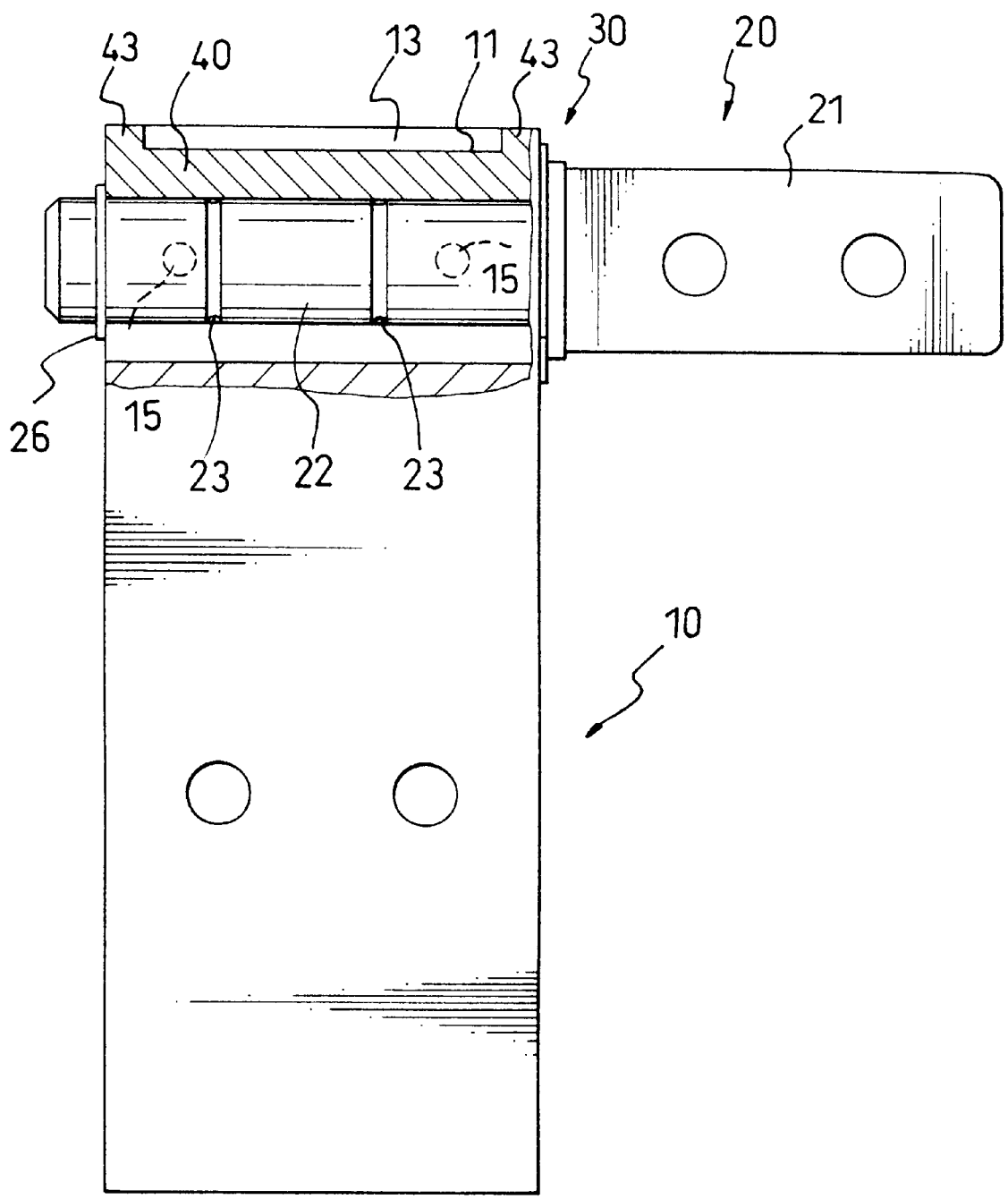
FIG. 9 is a front plan view in partial section of a variation of the hinge for a notebook computer in FIG. 8.

Most of the embodiment shown in FIG. 9 is the same as the one shown in FIG. 8 and the difference lies in:

the shaft (22) has a constant diameter and is held in the receiver (101) by a C-ring (25) engaging with a circular groove (27) as shown in FIG. 7 defined on the surface of the shaft (22) after the shaft (22) is inserted into the hole (11).

From the above description, it is noted that the invention has the following advantages:

1. high strength.

the thickness of the seat (101) tapers gradually to the gap (13). Due to this gradual taper of the receiver (101), the strength of the leaf is (10) significantly enhanced.

2. better lubrication thus longer life span.

3. fewer constituent parts.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer, comprising:

a leaf (10) having an elastic receiver (101) and a connector (102) securely formed on the receiver (101) for connection to the body of the notebook computer, the receiver (101) being a cylinder having a hole (11) axially defined therein and having a gap (13) axially defined through the entire length of the receiver (101) and communicating with the hole (11), a pintle (20) having a connection portion (21) for connection with the screen of a notebook computer and a shaft (22) pivotally received in the hole (11);

wherein the thickness of the receiver (101) tapers gradually to the gap (13);

a slot (15) for lubrication is defined in the receiver (101) and extending inward to the surface of the hole (11); and a groove (23) is defined on the surface of the shaft (22), wherein the connector (101) extends in at least one direction from an elongation of the receiver (10), and the gap (13) is defined substantially on the opposite side of the receiver (101) from the elongation.

2. The hinge for a notebook computer as claimed in claim 1, wherein a ring (30) relatively fixed with respect to the pintle (20) and a stop (12) formed on a bottom of the receiver (101) are provided whereby due to the formation of the stop (12) on the bottom of the receiver (101) and a cam sector (31) formed on the ring (30), the rotation of the ring (30) as well the pintle (20) will be limited because of the engagement between the cam sector (31) formed on the periphery of the ring (30) and the stop (12).

3. The hinge for a notebook computer as claimed in claim 2, wherein the ring (30) is fixed with respect to the pintle (20) by an elliptic opening (32) defined therein and covering on an elliptic collar (26) formed on the pintle (20).

4. The hinge for a notebook computer as claimed in claim 1, wherein the slot (15) is defined on the inner surface of the hole (11) of the receiver (101).

5. The hinge for a notebook computer as claimed in claim 1, wherein the connector (102) is "L" shaped and extends tangentially down from one side end of the receiver (101).

6. The hinge for a notebook computer as claimed in claim 1, wherein a receiver liner (40) is inserted in the hole (11), and this receiver liner (40) pivotally receives the shaft (22).

7. The hinge for a notebook computer as claimed in claim 6, wherein the receiver liner (40) has at least one lug (43) formed on the surface of the receiver liner (40) which is able to engage with the receiver (101) gap (13) to fix the receiver liner (40) with respect to the leaf (10).

* * * * *